US008279771B2

(12) United States Patent
Xu et al.

(10) Patent No.: US 8,279,771 B2
(45) Date of Patent: Oct. 2, 2012

(54) METHODS, APPARATUS AND ARTICLES OF MANUFACTURE TO MONITOR COMMUNICATION PATHS IN COMMUNICATION SYSTEMS

(75) Inventors: Zhijian Xu, Duluth, GA (US); Chee Ching, Holmdel, NJ (US); Kevin D'Souza, Cranbury, NJ (US); Joseph Lu, Manalapan, NJ (US); David H. Lu, Morganville, NJ (US); Chen-Yui Yang, Marlboro, NJ (US); Leah Li Zhang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 139 days.

(21) Appl. No.: 12/567,312

(22) Filed: Sep. 25, 2009

(65) Prior Publication Data

US 2011/0075567 A1    Mar. 31, 2011

(51) Int. Cl.
*H04L 12/28* (2006.01)
(52) U.S. Cl. ........................................ 370/252; 370/401
(58) Field of Classification Search .......... 370/216–218, 370/225, 228, 248, 252, 351, 400, 401
See application file for complete search history.

(56) References Cited

U.S. PATENT DOCUMENTS

| | | | | |
|---|---|---|---|---|
| 6,973,517 B1 * | 12/2005 | Golden et al. | ................. | 710/104 |
| 7,302,704 B1 * | 11/2007 | Elliott | .............................. | 726/22 |
| 7,423,980 B2 | 9/2008 | Ould-Brahim | | |
| 7,664,043 B1 * | 2/2010 | D'Souza et al. | ............. | 370/242 |
| 7,916,708 B2 * | 3/2011 | Hart | ............................... | 370/338 |
| 2005/0243822 A1 * | 11/2005 | Jain et al. | ....................... | 370/389 |
| 2006/0002408 A1 | 1/2006 | Ould-Brahim | | |
| 2007/0103324 A1 | 5/2007 | Kosuge et al. | | |
| 2007/0253328 A1 * | 11/2007 | Harper et al. | .................. | 370/217 |
| 2008/0186871 A1 | 8/2008 | Trevino et al. | | |
| 2008/0298379 A1 | 12/2008 | Ould-Brahim | | |
| 2010/0094981 A1 * | 4/2010 | Cordray et al. | ............... | 709/222 |
| 2010/0238934 A1 * | 9/2010 | Bharali et al. | ................ | 370/392 |
| 2011/0063985 A1 * | 3/2011 | Wang et al. | .................... | 370/248 |

OTHER PUBLICATIONS

Sailhan et al., "Wireless Mesh Network Monitoring: Design, Implementation and Experiments," Globecom 2007, IEEE Workshop on Distributed Autonomous Network Management Systems, Nov. 26-30, 2007 (6 pages).
Network Instruments, "Monitoring Service Delivery in an MPLS Environment," White Paper, Nov. 2007 (6 pages).
McGillicuddy, "Monitoring MPLS Network Architecture, Service Levels and Connectivity," SearchNetworking.com, Feb. 5, 2009 (4 pages).

* cited by examiner

*Primary Examiner* — Kerri Rose
(74) *Attorney, Agent, or Firm* — Hanley, Flight & Zimmerman, LLC

(57) ABSTRACT

Example methods, apparatus and articles of manufacture to monitor communication paths in communication systems are disclosed. A disclosed example method includes identifying first and second inter-network communication links of a communication system, identifying a first plurality of router pairs associated with the first inter-network communication link, identifying a second plurality of router pairs associated with the second inter-network communication link, partitioning the first plurality of router pairs into a first subset of router pairs and a second subset of router pairs, partitioning the second plurality of router pairs into a third subset of router pairs and a fourth subset of router pairs, during a first time interval, performing first reachability tests for respective ones of the first and third subsets of router pairs, and during a second time interval, performing second reachability tests for respective ones of the second and fourth subsets of router pairs.

18 Claims, 6 Drawing Sheets

METHODS, APPARATUS AND ARTICLES OF MANUFACTURE TO MONITOR COMMUNICATION PATHS IN COMMUNICATION SYSTEMS

FIELD OF THE DISCLOSURE

This disclosure relates generally to communication systems and, more particularly, to methods, apparatus and articles of manufacture to monitor communication paths in communication systems.

BACKGROUND

Service providers are increasingly implementing multiprotocol label switching (MPLS) based networks to provide communication services. Enterprise customers are increasingly adopting MPLS-based VPN services to implement a communication network among their respective customer sites via a service provider's MPLS-based network. Such MPLS-based VPNs provide direct any-to-any reachability among an enterprise's customer sites. Accordingly, many service provider MPLS-based networks implement a mesh of interconnections between a large number of routers.

DETAILED DESCRIPTION

Figure 1:
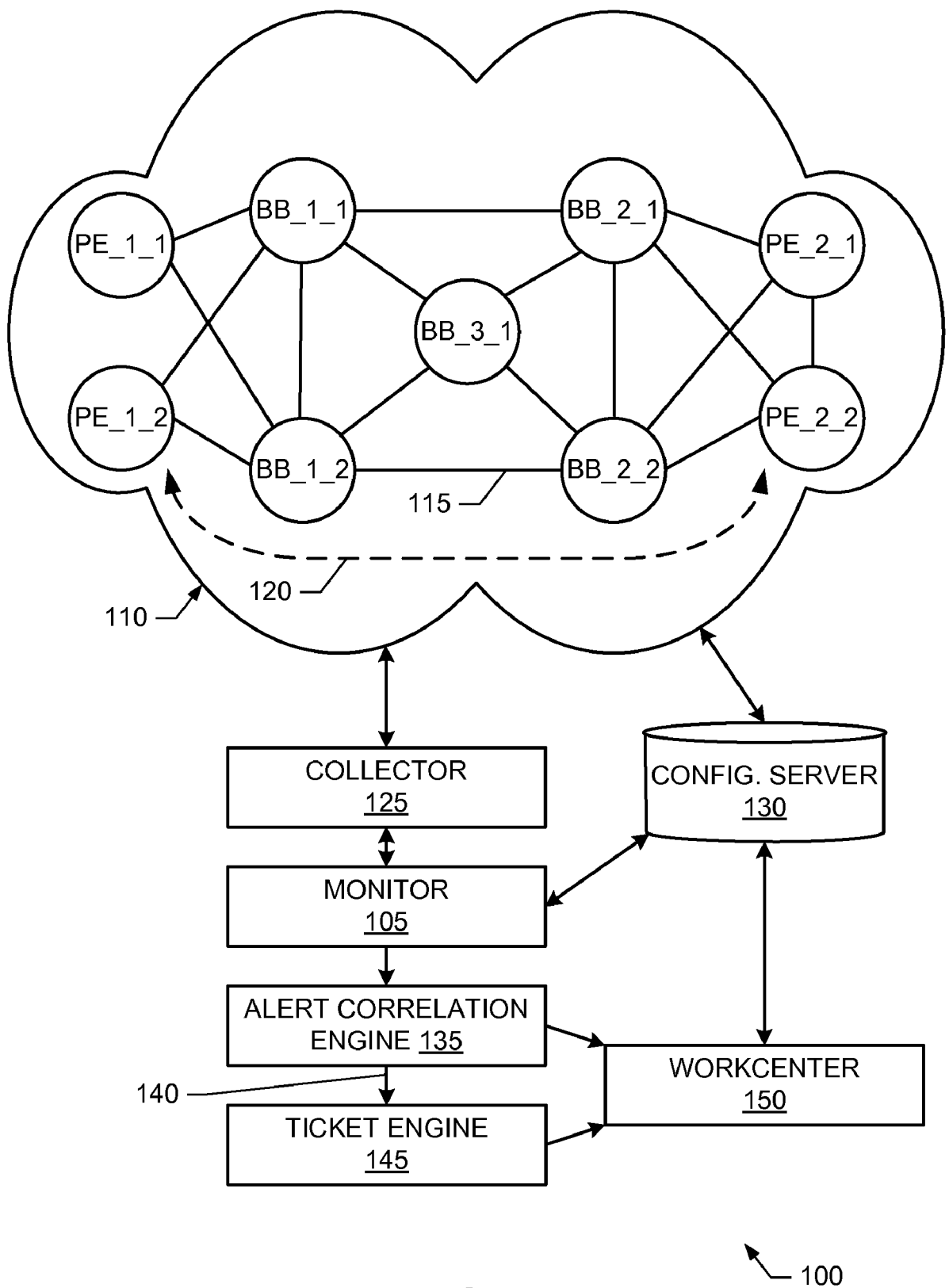
FIG. 1 is a schematic illustration of an example communication network having a monitor constructed in accordance with the teachings of this disclosure.

Example methods, apparatus and articles of manufacture to monitor communication paths in communication systems are disclosed. A disclosed example method includes identifying first and second inter-network communication links of a communication system, identifying a first plurality of router pairs associated with the first inter-network communication link, identifying a second plurality of router pairs associated with the second inter-network communication link, partitioning the first plurality of router pairs into a first subset of router pairs and a second subset of router pairs, partitioning the second plurality of router pairs into a third subset of router pairs and a fourth subset of router pairs, during a first time interval, performing first reachability tests for respective ones of the first and third subsets of router pairs, and during a second time interval, performing second reachability tests for respective ones of the second and fourth subsets of router pairs.

A disclosed example apparatus includes a topology analyzer to create a list of router pairs for a communication system, a monitoring subset creator to partition the list of router pairs into a first subset of router pairs and a second subset of router pairs to satisfy a network test coverage criteria, and a collector to, during a first time interval, perform first reachability tests for respective ones of the first subset of router pairs, and to, during a second time interval, perform second reachability tests for respective ones of the second subset of router pairs.

A disclosed example article of manufacture stores machine-readable instructions that, when executed, cause a machine to identify a first plurality of routers associated with a first location, identify a second plurality of routers associated with a second location, partition the first plurality of routers into a first subset of routers and a second subset of routers, partition the second plurality of routers into a third subset of routers and a fourth subset of routers, during a first time interval, perform first reachability tests for respective first pairs of the first and third subsets of routers, and during a second time interval, perform second reachability tests for respective second pairs of the second and fourth subsets of routers.

In the interest of brevity and clarity, throughout the following disclosure references will be made to example communication systems. However, the methods and apparatus described herein to monitor communication paths are applicable to other communication systems implemented using any number and/or type(s) of additional and/or alternative network technologies, topologies and/or protocols.

Due to increases in network traffic, network routes, and/or the popularity of virtual private network (VPN) based communication services, the size and complexity of communication systems and/or networks have increased dramatically. In many instances such communication systems implement a full and/or partial mesh of connectivity between a large number of provider edge (PE) routers and/or between multiple communication networks. Such trends may reduce and/or inhibit the ability of a network provider to proactively monitor their communication systems and/or networks in real-time for reachability and/or connectivity failures within their systems and/or networks and/or within their customer's VPNs. When such failures occur, customers may experience degraded performance, loss of connectivity, and/or customer data may be blocked, dropped and/or delayed. As the number of communication paths in a communication system increases, traditional monitoring methods may fail to test a sufficient and/or representative set and/or number of communication paths within a desired period of time, thereby decreasing the ability of the network operator to promptly know, ascertain and/or determine the status of their communication system. Without substantially complete information regarding the status of their communication system, the network operator may be unable to proactively detect, diagnose and/or correct network and/or communication failures in a timely manner, thereby resulting in decreased customer satisfaction.

To overcome at least these difficulties, the examples described herein selectively, purposefully and/or intelligently partition the full mesh of communication paths of a communication system into subsets. The communication path subsets are tested over respective ones of a sequence of different test intervals. Because the examples described herein select the subsets of communication paths such that each subset preferably includes a test of every communication link of the communication system, the status of the communication system can be ascertained during each test interval. For example, assuming first and second pairs of routers communicate via the same communication link, if connectivity between the first pair is tested during a first test interval and connectivity between the second pair is tested during a second test interval, the communication link is tested during both the first and second test intervals. However, by partitioning the first and second pairs of routers into different subsets that are associated with different test intervals, the number of connectivity tests that must be completed during both test intervals may be substantially reduced. By ensuring that all communication paths are tested within a particular period of time, the network operator can monitor the status of all PE router to PE router connections. In some examples, the partitioning of router pairs and/or communication paths is performed dynamically (e.g., periodically and/or aperiodically) as communication paths, communication links, routers, and/or routes are added and/or removed from the communication system.

FIG. 1 illustrates an example communication system 100 having a monitor 105 constructed in accordance with the teachings of this disclosure. To route data between customer endpoint (CE) routers (not shown for clarity of illustration), the example communication system 100 of FIG. 1 includes a communication network 110 having a plurality of PE routers, four of which are designated at reference numerals PE_1_1, PE_1_2, PE_2_1 and PE_2_2, and a plurality of core routers, five of which are designated at reference numerals BB_1_1, BB_1_2, BB_2_1, BB_2_2 and BB_3_1. The example routers PE_1_1, PE_1_2, PE_2_1, PE_2_2, BB_1_1, BB_1_2, BB_2_1, BB_2_2 and BB_3_1 of FIG. 1 may be communicatively coupled in any topology using any number and/or type(s) of communication links, one of which is designated at reference numeral 115. The example PE routers PE_1_1, PE_1_2, PE_2_1 and PE_2_2 of FIG. 1 communicate via communication paths (one of which is designated at reference numeral 120) carried and/or transported by and/or within the example communication links 115.

As discussed below in connection with FIG. 2, the routers PE_1_1, PE_1_2, PE_2_1, PE_2_2, BB_1_1, BB_1_2, BB_2_1, BB_2_2 and BB_3_1 may be implemented as part of more than one communication network and/or autonomous system (AS). Additionally or alternatively, as discussed below in connection with FIG. 3, the routers PE_1_1, PE_1_2, PE_2_1, PE_2_2, BB_1_1, BB_1_2, BB_2_1, BB_2_2 and BB_3_1 may be implemented at different central offices and/or different central office locations. In the examples described herein, the routers PE_1_1, PE_1_2, PE_2_1, PE_2_2, BB_1_1, BB_1_2, BB_2_1, BB_2_2 and BB_3_1 use multiprotocol label switching (MPLS) to route customer traffic. However, any number and/or type(s) of additional and/or alternative protocol(s) and/or method(s) may be used to route customer traffic.

To monitor the status of the communication paths 120, the example communication system 100 of FIG. 1 includes the example monitor 105 and a collector 125. For each test interval, the example monitor 105 of FIG. 1 specifies for the collector 125 a subset of the communication paths 120 of the communication system 100 to be tested. For each communication path to be tested, the example collector 125 of FIG. 1 executes one or more commands on the pair of routers associated with the communication path to test connectivity and/or reachability between the pair of routers via the communication path. For example, to test the example communication path 120, the collector 125 executes the command(s) on the PE routers PE_1_2 and PE_2_2. In some examples, the pair of routers execute a VPN reachability test to test the communication path 120. Results of the tests of the subset of communication paths are returned by the example collector 125 to the example monitor 105, which classifies the test result(s) using any number and/or type(s) of method(s), rule(s), logic and/or criterion(-ia).

The example monitor 105 of FIG. 1 collects network and/or router configuration and/or topology information by, for example, querying a network configuration server 130 and/or by performing one or more traces of the example communication network 110 via the example collector 125. Based on the collected network and/or router configuration and/or topology information, the example monitor 105 of FIG. 1 creates a list of the communication paths 120 of the communication system 100, and partitions the list of communication paths 120 into subsets of communication paths, which are to be tested during respective ones of a sequence of different test intervals. The example monitor 105 of FIG. 1 can partition the list of communication paths 120 using any number and/or type(s) of method(s), algorithm(s), logic and/or criterion(-ia).

Figure 2:
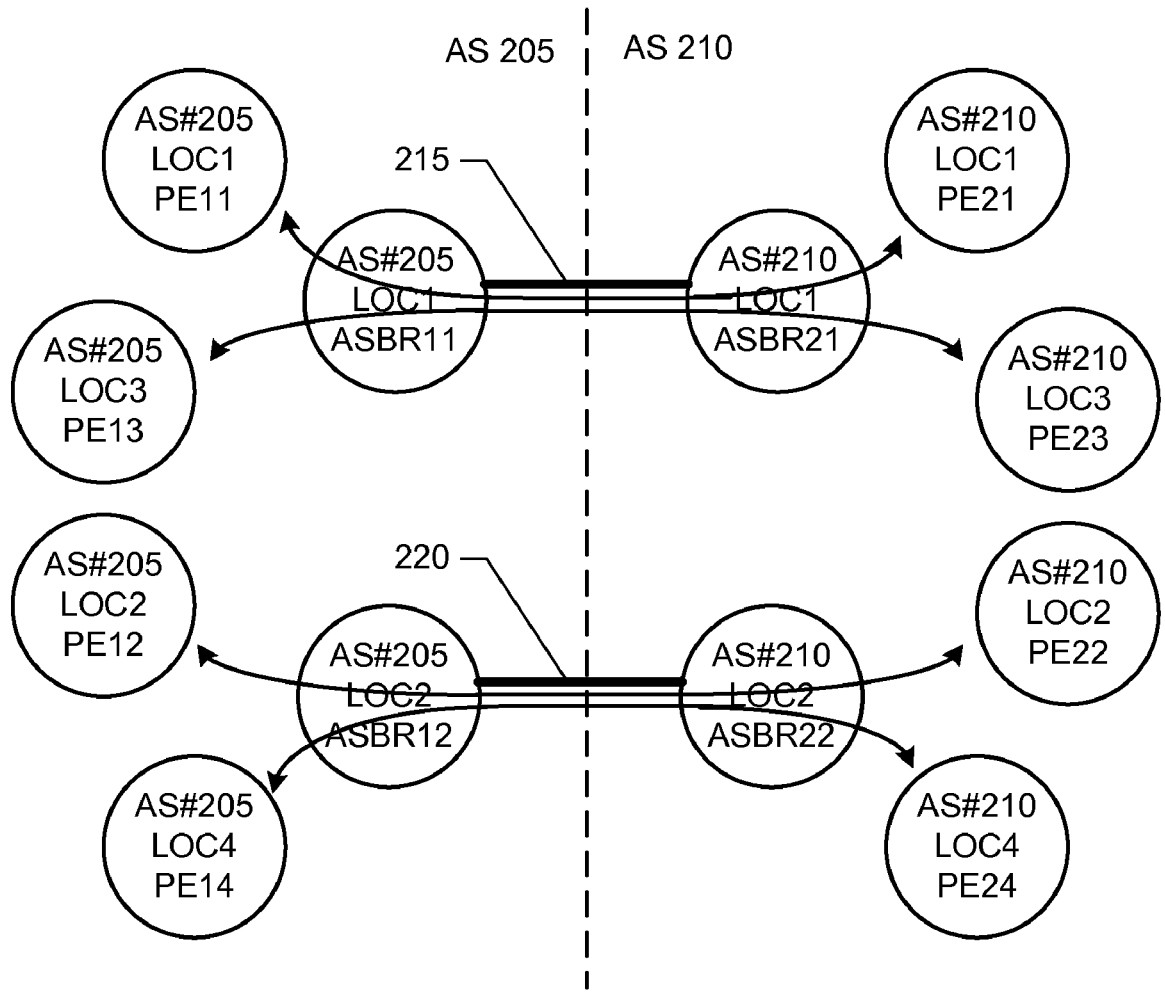
FIGS. 2 and 3 illustrate example manners of selecting monitoring subsets.

FIG. 2 illustrates an example method of partitioning a list of communication paths between two different communication networks and/or ASs. In the illustrated example of FIG. 2, a first AS 205 communicates with a second AS 210 via two different inter-network and/or inter-AS communication links 215 and 220. As shown in FIG. 2, more than one pair of PE routers may communicate via the inter-network communication links 215 and 220. For example, a first router pair including PE11 and PE21, and a second router pair including PE13 and PE23 both communicate via the example inter-network communication link 215.

For each inter-network communication link 215, 220, the example monitor 105 of FIG. 1 identifies the pair(s) of routers that communicate via that inter-network communication link 215, 220. The example monitor 105 assigns a substantially equal number of the identified pairs of routers to each communication path subset, which are tested during respective ones of a sequence of different test intervals. For example, the first pair PE11-PE21 may be assigned to a first subset tested during a first test interval, and the second pair PE13-PE23 assigned to a second subset tested during a second test interval.

Figure 3:
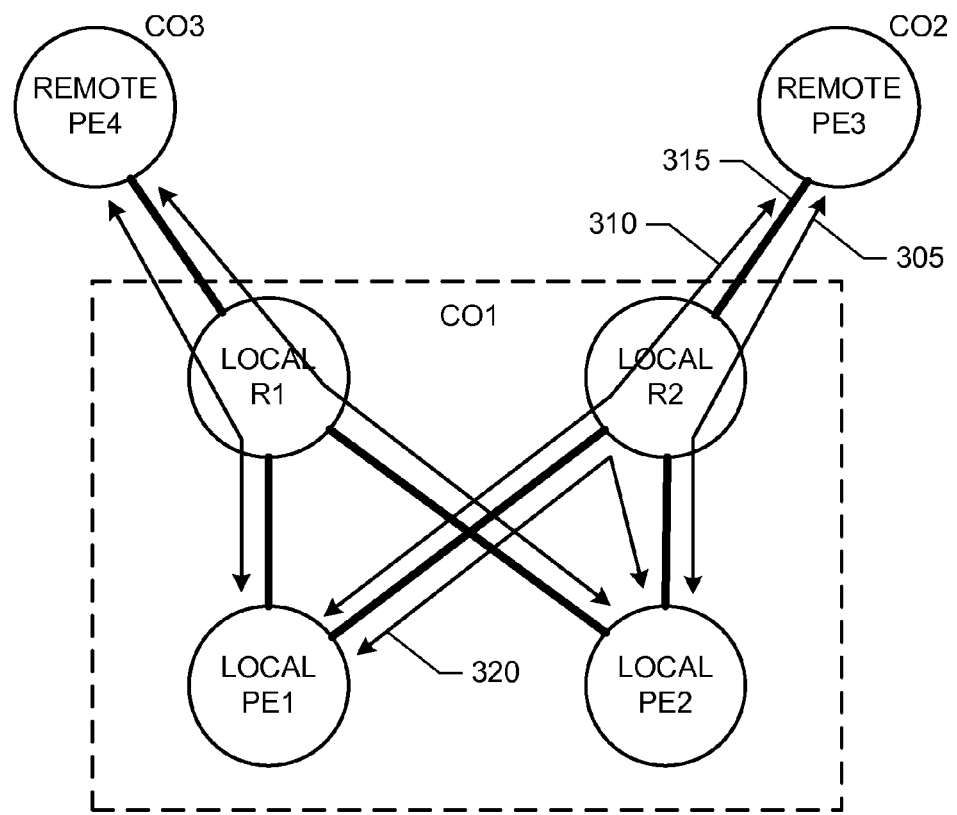

FIG. 3 illustrates an additional and/or alternative example method of partitioning a list of communication paths between different central offices CO1, CO2 and CO3. In the illustrated example of FIG. 3, PE routers PE1, PE2, PE3 and PE4 are not directly communicatively coupled but instead route customer traffic through one or more intervening core routers R1 and R2. As shown in FIG. 3, a test of a communication path 305 between PE routers PE2 and PE3 and a test of a communication path 310 between PE routers PE1 and PE3 both test a link 315 between CO1 and CO2. Results of the testing of the communication paths 305 and 310 can be used to determine and/or infer the status of an inter-CO communication path 320 between routers PE1 and PE2. Accordingly, it is not necessary to test inter-CO communication paths 320 as they are tested via the testing of the intra-CO communication paths 305 and 310.

To avoid duplicative testing of communication paths during test intervals, the example monitor 105 of FIG. 1 creates a list of the routers at each central office CO1, CO2 and CO3. For each central office CO1, CO2, CO3, the example monitor 105 partitions its list of routers into substantially equal subsets. For each test interval, the example monitor 105 selects one of the partitioned subsets of routers for each of the central offices CO1, CO2 and CO3. Using the selected router subsets, the example monitor 105 defines the subset of communication paths to be tested during the test interval to include a full mesh of all intra-CO pairs of the selected subsets of routers.

Returning to FIG. 1, to identify network faults based on the tests performed by the example collector 125 and classified by the example monitor 105, the example communication system 100 of FIG. 1 includes an alert correlation engine 135. Using any number and/or type(s) of algorithm(s), method(s) and/or logic, the example alert correlation engine 135 of FIG.

1 correlates and/or compares identified and/or detected connectivity and/or reachability failures to identify, locate and/or detect communication link failures and/or router failures. For example, if two communication paths 120 transported via a same communication link 115 have failed, the communication link 115 may have failed. However, if only one of the communication paths 120 has failed, the network failure is likely caused by another and/or a different communication link and/or router not used by the non-failed communication path 120. When the example alert correlation engine 135 of FIG. 1 detects a potential network failure, the alert correlation engine 135 sends a simple network management protocol (SNMP) alert 140 to a ticket engine 145 and, in some examples, notifies a workcenter 150.

The example ticket engine 145 of FIG. 1 automatically creates and/or opens a trouble ticket for the identified potential network failure in response to the SNMP alert 140, and forwards the trouble ticket to the workcenter 150 for subsequent diagnosis, troubleshooting, repair and/or resolution by appropriate personnel.

While an example communication system 100 has been illustrated in FIG. 1, one or more of the communication links, servers, platforms, monitors, data structures and/or devices illustrated in FIG. 1 may be combined, divided, re-arranged, omitted, eliminated and/or implemented in any other way. Further, the example monitor 105, the example collector 125, the example configuration server 130, the example alert correlation engine 135, the example ticket engine 145 and/or the example workcenter 150 of FIG. 1 may be implemented by hardware, software, firmware and/or any combination of hardware, software and/or firmware. Thus, for example, any of the example monitor 105, the example collector 125, the example configuration server 130, the example alert correlation engine 135, the example ticket engine 145 and/or the example workcenter 150 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the communication system 100 may include communication links, servers, platforms, monitors, data structures and/or devices instead of, or in addition to, those illustrated in FIG. 1 and/or may include more than one of any or all of the illustrated communication links, servers, platforms, monitors, data structures and/or devices.

Figure 4:
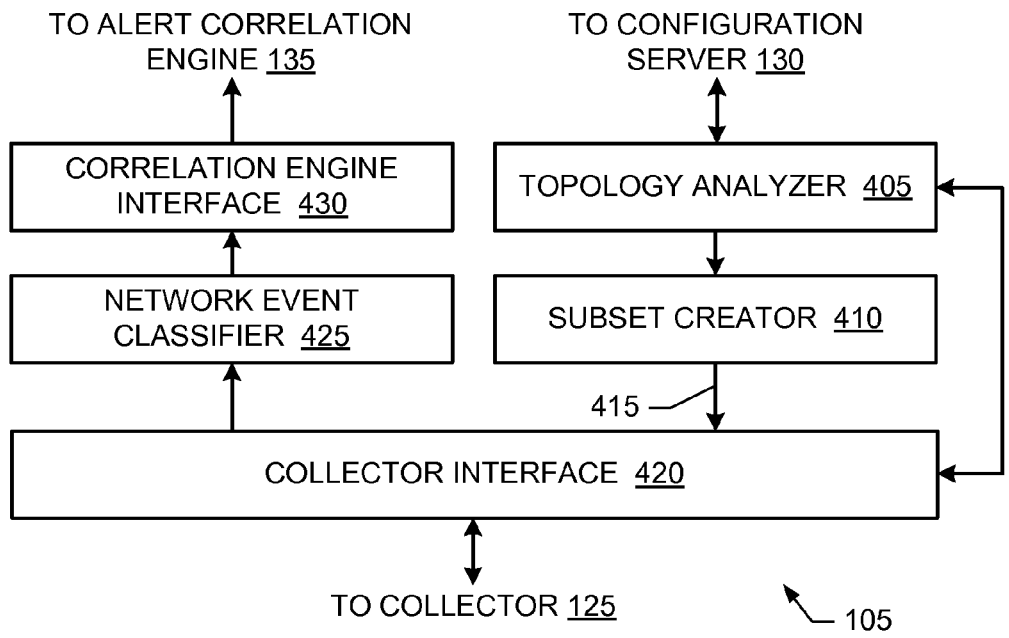
FIG. 4 illustrates an example manner of implementing the example monitor of FIG. 1.

FIG. 4 illustrates an example manner of implementing the example monitor 105 of FIG. 1. To create a list of the communication paths 120 of a communication system, the example monitor 105 of FIG. 4 includes a topology analyzer 405. The example topology analyzer 405 of FIG. 4 collects network and/or router configuration and/or topology information by, for example, querying a network configuration server 130 and/or by performing one or more traces of the example communication network 110 via the example collector 125. Based on the collected network and/or router configuration and/or topology information, the example topology analyzer 405 creates a list of the communication paths 120 of the communication system 100.

To partition the list of communication paths 120 formed by the example topology analyzer 405, the example monitor 105 of FIG. 4 includes a subset creator 410. The example subset creator 410 of FIG. 4 partitions the list of communication paths 120 formed by the example topology analyzer 405 into subsets 415 of communication paths, which are to tested during respective ones of a sequence of different test intervals. Example methods to form the subsets 415 of communication paths were discussed above in connection with FIGS. 1-3. However, the list of communication paths 120 can be partitioned using any number and/or type(s) of method(s), algorithm(s), logic and/or criterion(-ia).

To interact with the example collector 125, the example monitor 105 of FIG. 4 includes a collector interface 420. Using any number and/or type(s) of protocol(s), message(s) and/or command(s), the example collector interface 420 of FIG. 4 provides the subsets 415 of communication paths to the collector 125 and receives test results from the collector 125. In some examples, the collector interface 420 provides one of the subsets 415 to the collector 125 each test interval. Additionally or alternatively, the example collector interface 420 could provide the collector 125 a plurality of subsets 415 that are to be tested over subsequent test intervals and/or may be repeated over a sequence of test intervals.

To classify test results, the example monitor 105 of FIG. 4 includes a network event classifier 425. Using any number and/or type(s) of method(s), rule(s), criterion(-ia) and/or logic, the example network event classifier 425 classifies the test result(s) received from the collector 125 via the collector interface 420.

To provide classified test results to the alert correlation engine 135, the example monitor 105 of FIG. 4 includes a correlation engine interface 430. Using any number and/or type(s) of protocol(s), message(s) and/or command(s), the example correlation engine interface 430 provides classified test results to the example alert correlation engine 135.

While an example manner of implementing the example monitor 105 of FIG. 1 has been illustrated in FIG. 4, one or more of the interfaces, modules, elements and/or devices illustrated in FIG. 4 may be combined, divided, re-arranged, omitted, eliminated and/or implemented in any other way. Further, the example topology analyzer 405, the example subset creator 410, the example collector interface 420, the example network event classifier 425, the example correlation engine interface 430 and/or, more generally, the example monitor 105 of FIG. 4 may be implemented by hardware, software, firmware and/or any combination of hardware, software and/or firmware. Thus, for example, any of the example topology analyzer 405, the example subset creator 410, the example collector interface 420, the example network event classifier 425, the example correlation engine interface 430 and/or, more generally, the example monitor 105 may be implemented by one or more circuit(s), programmable processor(s), ASIC(s), PLD(s) and/or FPLD(s), etc. Further still, the monitor 105 may include interfaces, modules, elements and/or devices instead of, or in addition to, those illustrated in FIG. 4 and/or may include more than one of any or all of the illustrated interfaces, modules, elements and/or devices.

Figure 5:
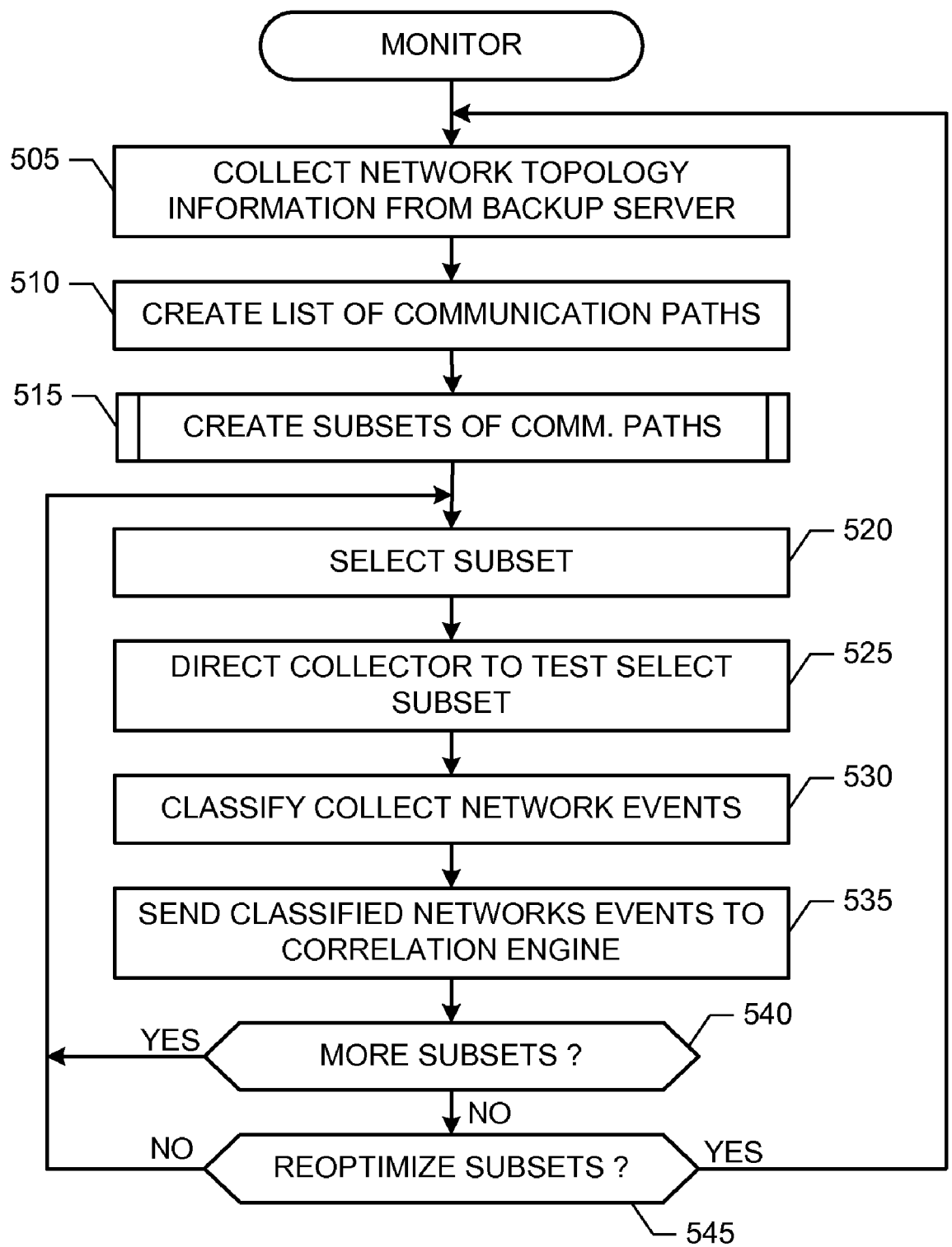
FIGS. 5 and 6 are flowcharts representative of example processes that may be carried out to implement the example monitor of FIGS. 1 and 4.
Figure 6:
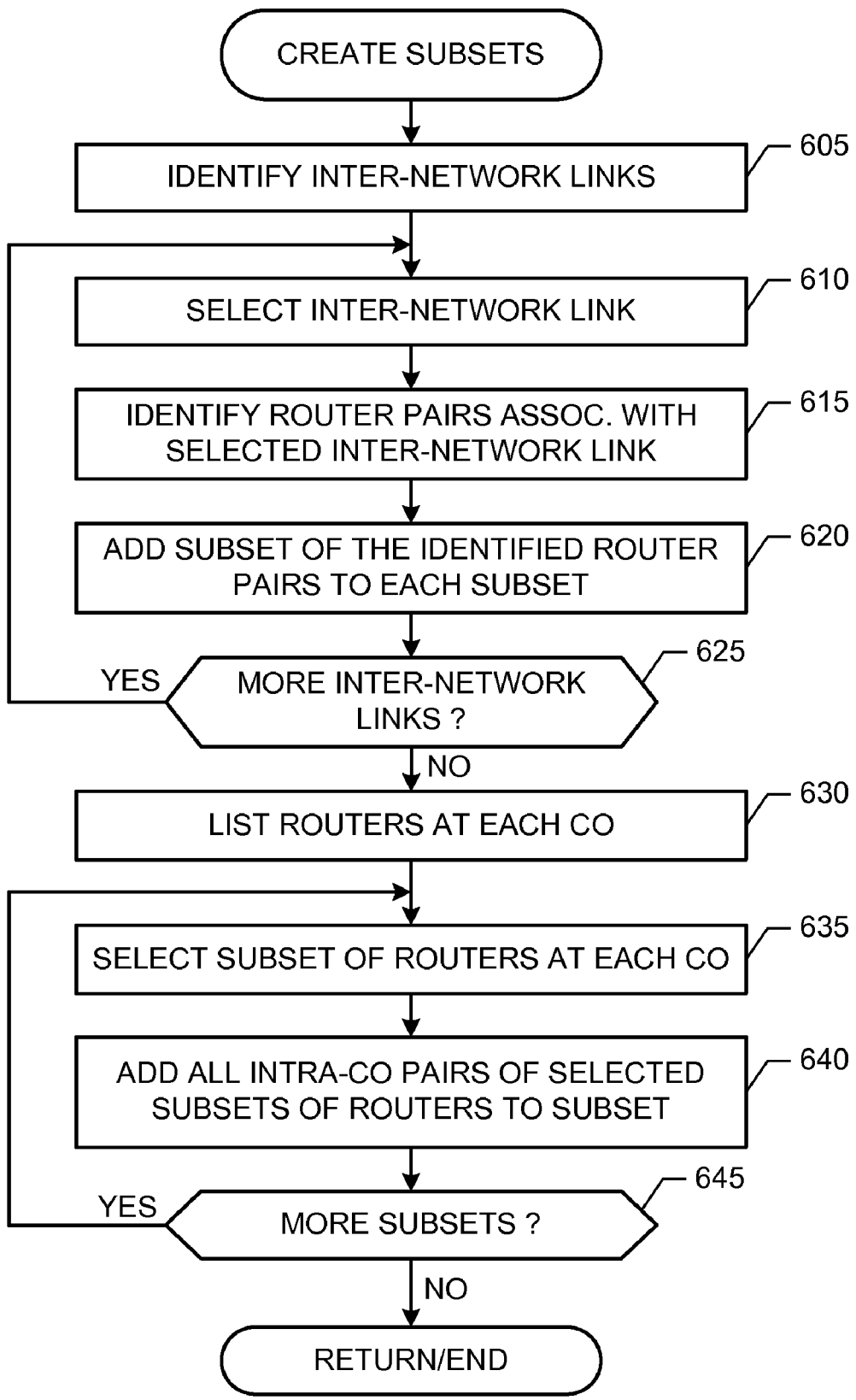

FIGS. 5 and 6 are flowcharts representative of example processes that may be carried out to implement the example monitor 105 of FIGS. 1 and 4. The example processes of FIGS. 5 and 6 may be carried out by a processor, a controller and/or any other suitable processing device. For example, the processes of FIGS. 5 and 6 may be embodied in coded instructions stored on any article of manufacture, such as any tangible computer-readable medium. Example tangible computer-readable medium include, but are not limited to, a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 7). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 5 and 6 may be implemented using any combination(s) of ASIC(s), PLD(s), FPLD(s), discrete logic, hardware, firmware, etc. Also, some or all of the example processes of FIGS. 5 and 6 may instead be implemented manually or as any combination of any of the foregoing techniques, for example, any combination of firmware, software, discrete logic and/or hardware. Further, many other methods of implementing the example operations of FIGS. 5 and 6 may be employed. For example, the order of execution of the blocks may be changed, and/or one or more of the blocks described may be changed, eliminated, sub-divided, or combined. Additionally, any or all of the example processes of FIGS. 5 and 6 may be carried out sequentially and/or carried out in parallel by, for example, separate processing threads, processors, devices, discrete logic, circuits, etc.

The example process of FIG. 5 begins when the example topology analyzer 405 collects network and/or router configuration and/or topology information by, for example, querying a network configuration server 130 and/or by performing one or more traces of the example communication network 110 via the example collector 125 (block 505). Based on the collected network and/or router configuration and/or topology information, the example topology analyzer 405 creates a list of the communication paths 120 of the communication system 100 (block 510). The example subset creator 410 partitions the list of communication paths 120 formed by the example topology analyzer 405 into subsets 415 of communication paths by, for example, carrying out the example process of FIG. 6 (block 515)

For a first test interval, the example collector interface 420 selects a first one of the subsets 415 of communication paths (block 520) and directs the collector 125 to test the subset 415 of communication paths (block 525). The example network event classifier 425 classifies test result(s) received from the collector 125 via the collector interface 420 (block 530) and the correlation engine interface 430 provides the classified test result(s) to the example alert correlation engine 135 (block 535).

If there are more subsets 415 of communication paths to test (block 540), control returns to block 520 to select the next subset 415. If there are no more subsets 415 to test (block 540), the monitor 105 determines whether to re-optimize the subsets 415 of communication paths (block 545). For example, the monitor 105 may periodically (e.g., once an hour, once a day, once a week, etc.) and/or aperiodically (as instructed by a network operator and/or technician) re-optimize the subsets 415 to ensure that newly added communication link(s), communication path(s), router(s) and/or network route(s) are tested and so that any removed communication link(s), communication path(s), router(s) and/or network route(s) are no longer tested. If the subsets 415 are to be re-optimized (block 545), control returns to block 505 to collect network and/or router configuration and/or topology information. If the subsets 415 are not to be re-optimized (block 545), control returns to block 520 to re-test the existing subsets 415.

The example process of FIG. 6 begins with the subset creator 410 identifying inter-network and/or inter-AS links (block 605). The subset creator 410 selects a first of the identified inter-network links (block 610) and identifies pairs of routers associated with the presently considered inter-network link (block 615). The subset creator 410 adds a substantially equal subset of the identified pairs of routers to each of the subsets 415 of communication paths (block 620). If there are more inter-network links to process (block 625), control returns to block 610 to select the next inter-network link.

If there are no more inter-network links to process (block 625), the subset creator 410 creates a list of the routers at each location and/or central office (block 630). The subset creator 410 selects a subset of the routers at each location and/or central office (block 635) and adds all intra-CO pairs of the selected subsets of the routers to a subset 415 of communication paths (block 640). If there are more subsets 415 to process (block 645), control returns to block 635 to select a new subset of the routers at each location and/or central office. If there are no more subsets 415 to process (block 645), control exits and/or returns from the example process of FIG. 6 to, for example, the example process of FIG. 5 at block 520.

Figure 7:
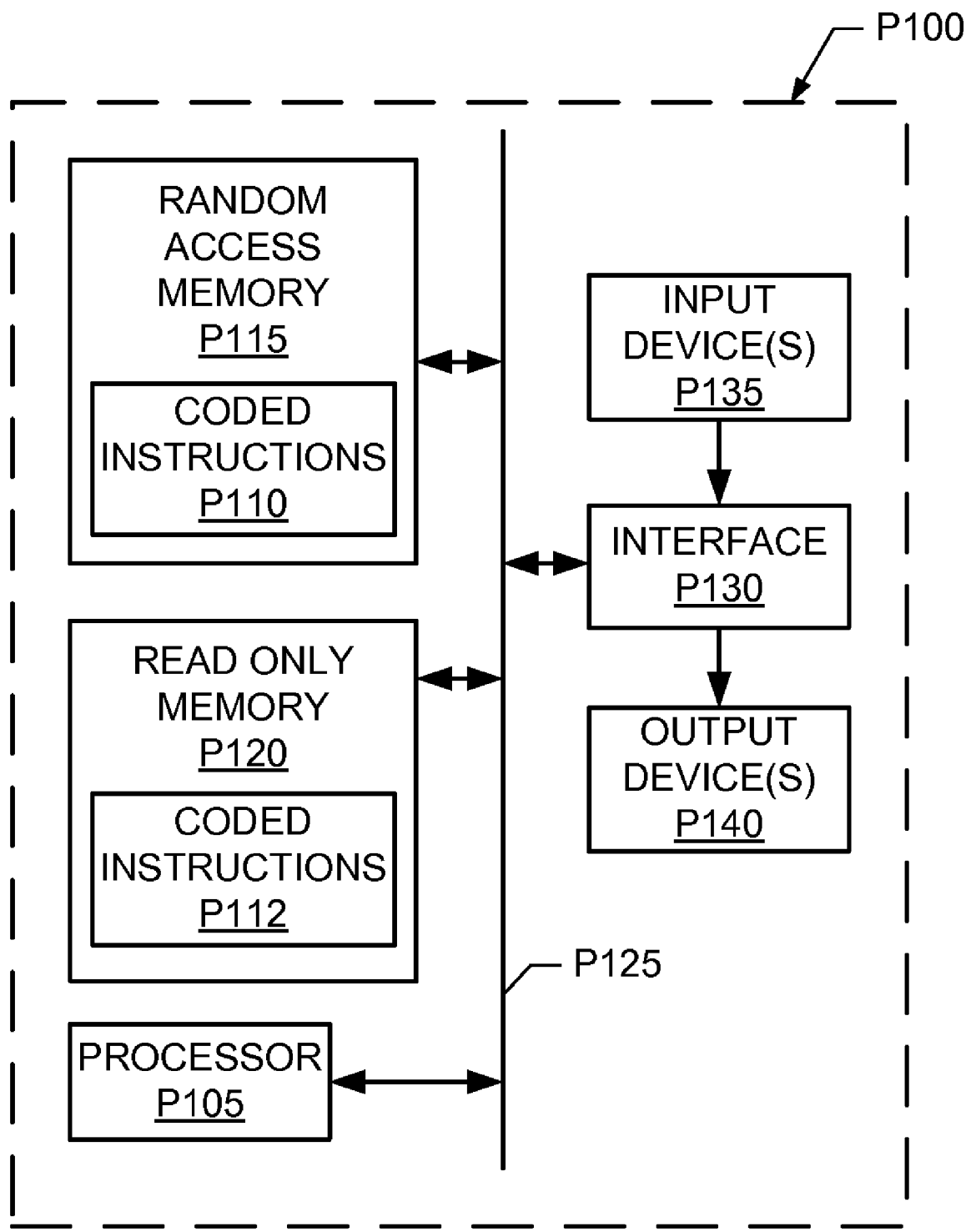
FIG. 7 is a schematic illustration of an example processor platform that may be used and/or programmed to carry out the example processes of FIGS. 5 and 6 and/or to implement any of all of the methods, apparatus and articles of manufacture disclosed herein.

FIG. 7 is a schematic diagram of an example processor platform P100 that may be used and/or programmed to implement any of the example monitors 105 of FIGS. 1 and 4. For example, the processor platform P100 can be implemented by one or more general-purpose processors, processor cores, microcontrollers, etc.

The processor platform P100 of the example of FIG. 7 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 5 and 6 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example collector interface 420 and/or the example correlation engine interface 430 of FIG. 4.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   identifying first and second inter-network communication links of a communication system;
   identifying a first plurality of router pairs associated with the first inter-network communication link;

identifying a second plurality of router pairs associated with the second inter-network communication link;

partitioning the first plurality of router pairs into a first subset of router pairs and a second subset of router pairs;

partitioning the second plurality of router pairs into a third subset of router pairs and a fourth subset of router pairs;

during a first time interval, performing first reachability tests for respective ones of the first and third subsets of router pairs;

during a second time interval, performing second reachability tests for respective ones of the second and fourth subsets of router pairs; and changing at least one router pair in the first subset of router pairs to the second subset of router pairs.

2. A method as defined in claim 1, wherein the first and second reachability tests collectively test all pairs of the first and second pluralities of router pairs.

3. A method as defined in claim 1, further comprising:
identifying a first plurality of routers associated with a first location;
identifying a second plurality of routers associated with a second location;
partitioning the first plurality of routers into a first subset of routers and a second subset of routers;
partitioning the second plurality of routers into a third subset of routers and a fourth subset of routers;
during the first time interval, performing third reachability tests for pairs of the first and third subsets of routers; and
during the second time interval, performing fourth reachability tests for pairs of the second and fourth subsets of routers.

4. A method as defined in claim 3, further comprising during the first time interval performing fifth reachability tests for pairs of the first and second subsets of routers.

5. A method as defined in claim 1, further comprising performing a network trace to identify the inter-network communication links.

6. A method as defined in claim 1, further comprising querying a network configuration server to identify the inter-network communication links.

7. A method as defined in claim 1, further comprising correlating results of the first and second reachability tests to identify a communication system fault.

8. A method as defined in claim 1, further comprising:
during a third time interval, performing third reachability tests for respective ones of the first and third subsets of router pairs; and
during a fourth time interval, performing fourth reachability tests for respective ones of the second and fourth subsets of router pairs.

9. A method as defined in claim 3, wherein the first location is a first central office and the second location is a second central office.

10. An apparatus comprising
a topology analyzer to create a list of router pairs for a communication system;
a monitoring subset creator to partition the list of router pairs into a first subset of router pairs and a second subset of router pairs to satisfy a network test coverage criteria; and
a collector to, during a first time interval, perform first reachability tests for respective ones of the first subset of router pairs, and to, during a second time interval, perform second reachability tests for respective ones of the second subset of router pairs.

11. An apparatus as defined in claim 10, wherein the network test coverage criteria comprises testing each inter-network communication link of the communication system during each of the first and second time intervals.

12. An apparatus as defined in claim 10, wherein the network test coverage criteria comprises testing each inter central office link of the communication system during each of the first and second time intervals.

13. An apparatus as defined in claim 10, further comprising:
a classifier to classify results of the first and second reachability tests; and
an interface to send the classified results to a troubleshooting correlation engine.

14. An apparatus as defined in claim 10, wherein the monitoring subset creator is to partition the list of the router pairs into the first subset and the second subset by:
identifying a first plurality of routers associated with a first location;
identifying a second plurality of routers associated with a second location;
partitioning the first plurality of routers into a first subset of routers and a second subset of routers; and
partitioning the second plurality of routers into a third subset of routers and a fourth subset of routers, wherein the first subset of router pairs includes respective pairs of the first and third subsets of routers, and the second subset of router pairs includes respective pairs of the first and third subsets of routers.

15. An article of manufacture storing machine-readable instructions that, when executed, cause a machine to at least:
identify a first plurality of routers associated with a first location;
identify a second plurality of routers associated with a second location;
partition the first plurality of routers into a first subset of routers and a second subset of routers;
partition the second plurality of routers into a third subset of routers and a fourth subset of routers;
during a first time interval, perform first reachability tests for respective first pairs of the first and third subsets of routers;
during a second time interval, perform second reachability tests for respective second pairs of the second and fourth subsets of routers; and
change at least one router pair in the first subset of router pairs to the second subset of router pairs.

16. An article of manufacture as defined in claim 15, wherein the machine-readable instructions, when executed, cause the machine to at least, during the first time interval, perform third reachability tests for respective third pairs of the first and second subsets of routers.

17. An article of manufacture as defined in claim 15, wherein the first and second pairs collectively comprise all pairs of the first and second plurality of routers.

18. An article of manufacture as defined in claim 15, wherein the machine-readable instructions, when executed, cause the machine to at least correlate results of the first and second reachability tests to identify a fault in the network.

* * * * *